United States Patent
Strange et al.

(10) Patent No.: US 11,661,858 B2
(45) Date of Patent: May 30, 2023

(54) TURBINE GENERATOR

(71) Applicant: Rolls-Royce plc, London (GB)

(72) Inventors: Matthew L Strange, Derby (GB); Gareth J Roberts, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/654,466

(22) Filed: Mar. 11, 2022

(65) Prior Publication Data

US 2022/0298924 A1 Sep. 22, 2022

(30) Foreign Application Priority Data

Mar. 18, 2021 (GB) ..................... 2103747

(51) Int. Cl.
| | |
|---|---|
| *F01D 15/10* | (2006.01) |
| *H02K 7/18* | (2006.01) |
| *H02K 16/00* | (2006.01) |
| *F01K 11/02* | (2006.01) |

(52) U.S. Cl.
CPC ........... *F01D 15/10* (2013.01); *H02K 7/1823* (2013.01); *H02K 16/00* (2013.01); *F01K 11/02* (2013.01); *F05D 2220/32* (2013.01); *F05D 2220/76* (2013.01)

(58) Field of Classification Search
CPC ..... F01D 15/10; F01D 15/005; H02K 7/1823; H02K 16/00; H02K 21/14; F01K 11/02; F05D 2220/32; F05D 2220/76; F05D 2220/31; Y02T 50/60
See application file for complete search history.

(56) References Cited

U.S. PATENT DOCUMENTS

| | | | |
|---|---|---|---|
| 3,353,028 A | 11/1967 | Braikevitch et al. | |
| 9,143,023 B1 | 9/2015 | Uskert | |
| 10,897,182 B1 * | 1/2021 | Merrett | H02K 21/22 |
| 2010/0314885 A1 | 12/2010 | Presz, Jr. et al. | |

FOREIGN PATENT DOCUMENTS

| | | |
|---|---|---|
| EP | 0462724 A1 | 6/1991 |
| EP | 3 670 349 A1 | 6/2020 |
| GB | 1174969 A | 12/1969 |
| WO | 0029721 A1 | 5/2000 |

OTHER PUBLICATIONS

Sep. 5, 2022 extended Search Report issued in European Patent Application No. 22159328.8.

* cited by examiner

*Primary Examiner* — Joseph Ortega
(74) *Attorney, Agent, or Firm* — Oliff PLC

(57) ABSTRACT

A turbine generator comprising a turbine rotor comprising a hub and one or more blade stages. Each stage comprising a circumferential array of rotor blades in driving engagement with the hub. A turbine stator comprising a hub and one or more vane stages, each stage comprising a circumferential array of vanes. The turbine rotor and turbine stator being concentrically arranged about a common axis to define an annular flow path. The vane stages and blade stages being axially spaced along the axis and having one or more magnets arranged on the rotor. A generator stator concentrically aligned with the turbine rotor and turbine stator and one or more magnets arranged on the rotor. In use, when the turbine is driven to rotate about the axis, the or each of the magnets on the turbine rotor rotate relative to the generator stator in order to generate electric power.

13 Claims, 4 Drawing Sheets

TURBINE GENERATOR

CROSS-REFERENCE TO RELATED APPLICATIONS

This application claims priority pursuant to 35 U.S.C. 119(a) to United Kingdom Patent Application No. 2103747.8, filed Mar. 18, 2021, which application is incorporated herein by reference in its entirety.

FIELD OF THE DISCLOSURE

The present disclosure concerns a turbine generator. In particular the present disclosure concerns a turbine generator comprising a gas turbine engine or steam turbine.

BACKGROUND OF THE DISCLOSURE

Electricity generation occurs by converting a mechanical force into an electrical current through electromagnetic induction. The mechanical force, produced by external means, is used to rotate a conductor loop within a magnetic field. The magnetic field is provided by the positioning of permanent magnets around the conductor. During rotation of the loop each side of the coil is exposed to the north or south pole of permanent magnets that are positioned around the coil and consequently an Electromotive Force (EMF) is induced in the loop. As the wire is exposed to the different poles the direction of the EMF changes continuously; this changing EMF can be extracted to generate electricity. This concept is extended into more complex generators in power stations. Furthermore, Rankine or Brayton cycle power plants may be used in power stations or marine vessels to provide mechanical force. In such systems it is conventional to couple an output shaft of a steam or gas turbine, the prime mover, to the generator. The combined system is known as a turbo generator for a steam turbine prime mover and turbine generator for a gas turbine prime mover. For simplicity, the term turbine generator shall be used to describe both configurations.

FIG. 1 shows a typical Rankine cycle that is used in electricity generation. In such systems, a boiler 18 heats water to generate steam. The steam output from the boiler is directed into a turbine 10, where it is guided across the blades of a turbine rotor to rotate the turbine. The turbine rotor is coupled to a generator 12 via a shaft such that rotation of the turbine 10 causes a rotation of the generator, which in turn generates electricity. The steam is then passed through a condenser 14 and pump 16 before being returned to the boiler 18. The design of the turbine generator—chiefly the turbine 10 and generator 12—requires that the rotational speed of the turbine 10 is appropriate for the frequency of power produced by the generator 12. Instead of a steam turbine, a gas turbine engine can also be used to rotate the generator.

Such systems are used around the world in power generation in both large—and small—scale power stations. However, in such cases the turbine and the generators are effectively two independent machines that are coupled in series with each rotating element having its own associated bearing supports. Additionally, they also have separate enclosures. For example, in the case of a steam system, of the two enclosures: the first enclosure is used on the steam turbine to retain the steam; and the second enclosure is used on the generator to retain cooling air and maintain cleanliness. In addition to this, the rotating element of each machine is inserted inside a static housing.

It is desired to have an improved turbine generator that provides, for example, improved integration with a vehicle or power plant. Also, a reduction in complexity and size is desired.

SUMMARY OF THE DISCLOSURE

According to a first aspect there is provided a turbine generator comprising: a turbine rotor comprising a hub and one or more blade stages, each stage comprising a circumferential array of rotor blades in driving engagement with the hub; a turbine stator comprising a hub and one or more vane stages, each stage comprising a circumferential array of vanes; the turbine rotor and turbine stator being concentrically arranged about a common axis to define an annular flow path, the vane stages and blade stages being axially spaced along the axis, and having one or more magnets arranged on the rotor; and, a generator stator concentrically aligned with the turbine rotor and turbine stator; and one or more magnets arranged on the rotor whereby in use, when the turbine is driven to rotate about the axis, the or each of the magnets on the turbine rotor rotate relative to the generator stator in order to generate electric power.

The generator stator may be arranged along the axis with the turbine stator radially outermost.

The turbine stator may be arranged along the axis with the generator stator radially outermost.

Each permanent magnet may be axially aligned with a rotor stage.

Each permanent magnet may not extend axially beyond the rotor hub.

Each permanent magnet may abut, or be fastened to a surface of, the rotor hub.

The rotor hub may be frustoconical.

The rotor hub may be cylindrical.

The turbine generator may be coupled to a compressor or turbine of a gas turbine engine.

According to a second aspect of the disclosure there is provided a gas turbine engine comprising the above disclosed turbine generator.

The turbine generator may be coupled to steam turbine, for example of a Rankine cycle.

According to a third aspect of the present disclosure there is a steam turbine comprising the above disclosed turbine generator.

There may be a single stage or multiple stages to the prime mover.

Advantageously the turbine generator may have a shorter axial length. Advantageously the turbine generator has a shorter axial length than a turbine generator where the turbine rotor and generator rotor are separate and axially aligned.

Advantageously the turbine generator may have a reduced overall weight or materials count. Advantageously the turbine generator may have a reduced overall weight or materials count compared to a turbine rotor and generator rotor are separate and axially aligned.

Advantageously the turbine generator provides better integration in a vehicle or power plant where space constraints exist, for example axial space constraints.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DISCUSSION OF THE FIGURES

Embodiments will now be described by way of example only, with reference to the Figures, in which.

DETAILED DESCRIPTION OF THE DISCLOSURE

Figure 1:
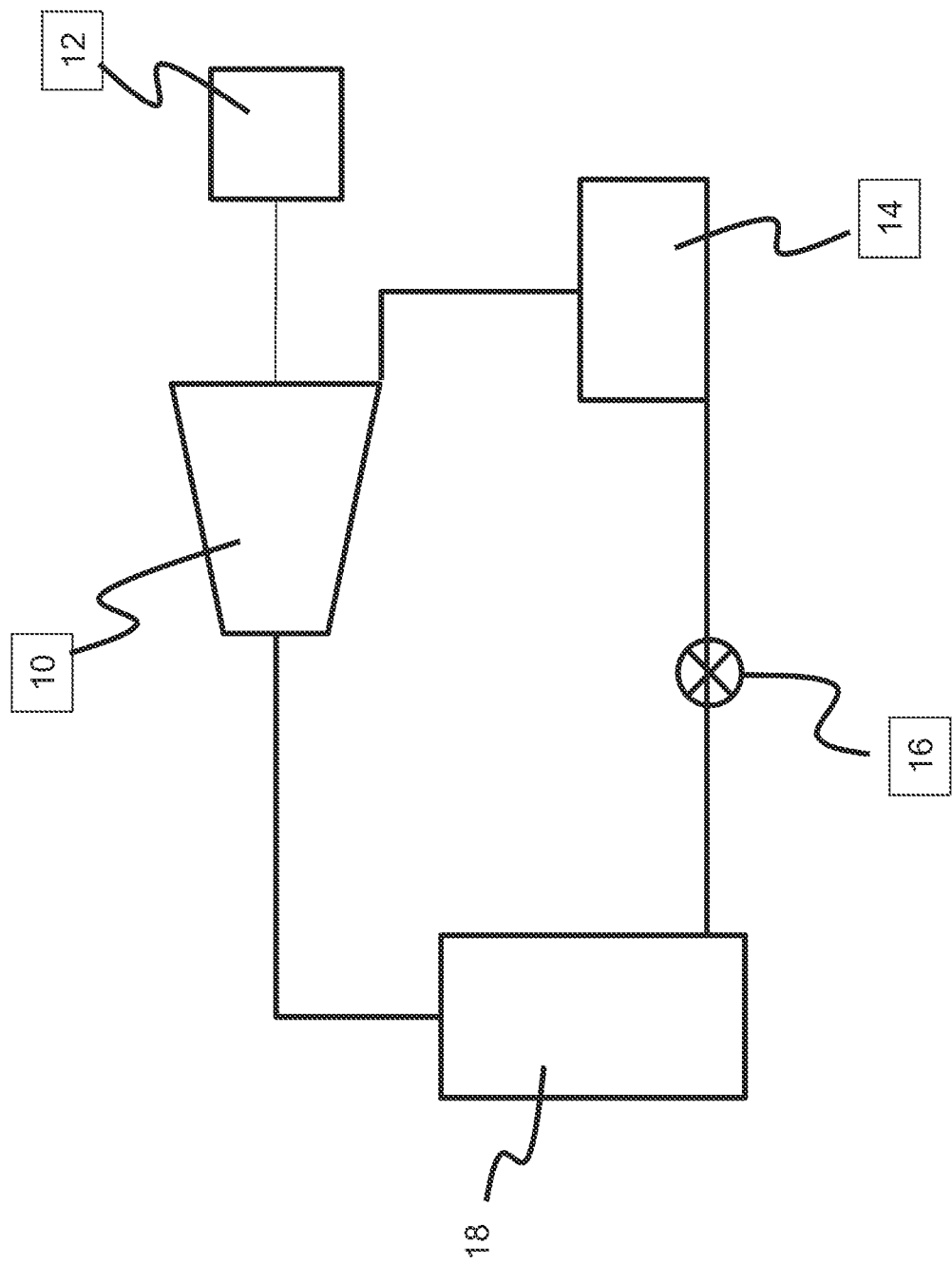
FIG. 1 is a Rankine cycle schematic diagram as is known in the art.
Figure 2:
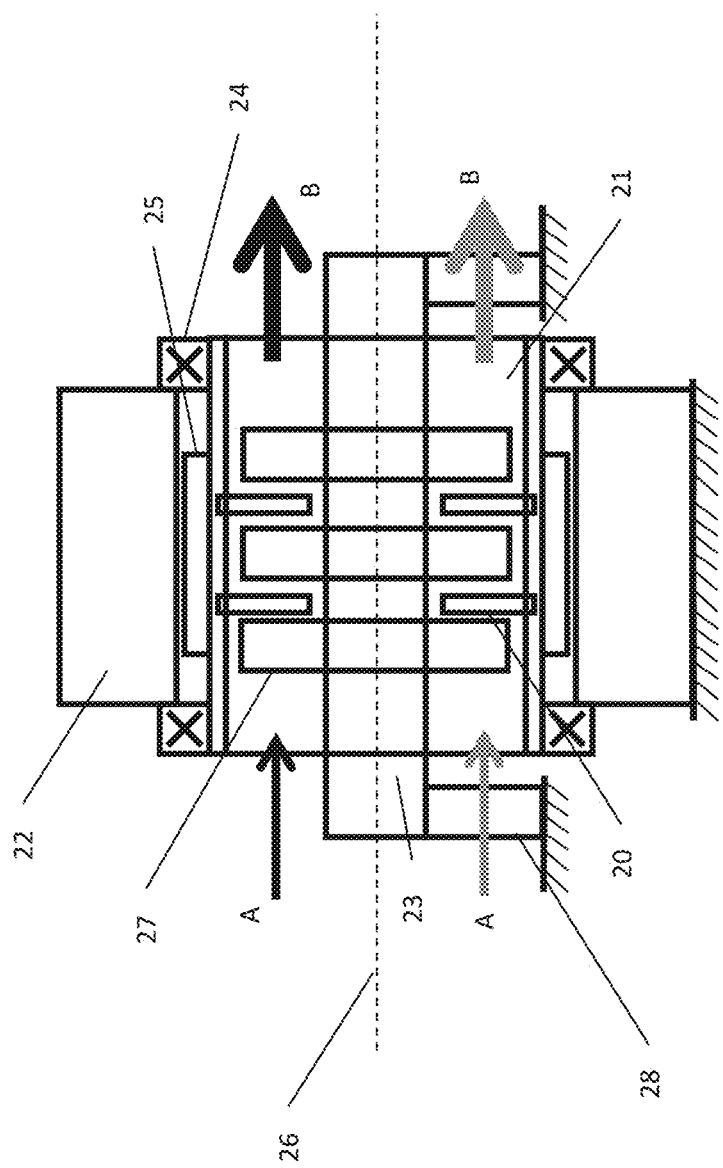
FIG. 2 is a sectional side view of a turbine generator as claimed herein.
Figure 3:
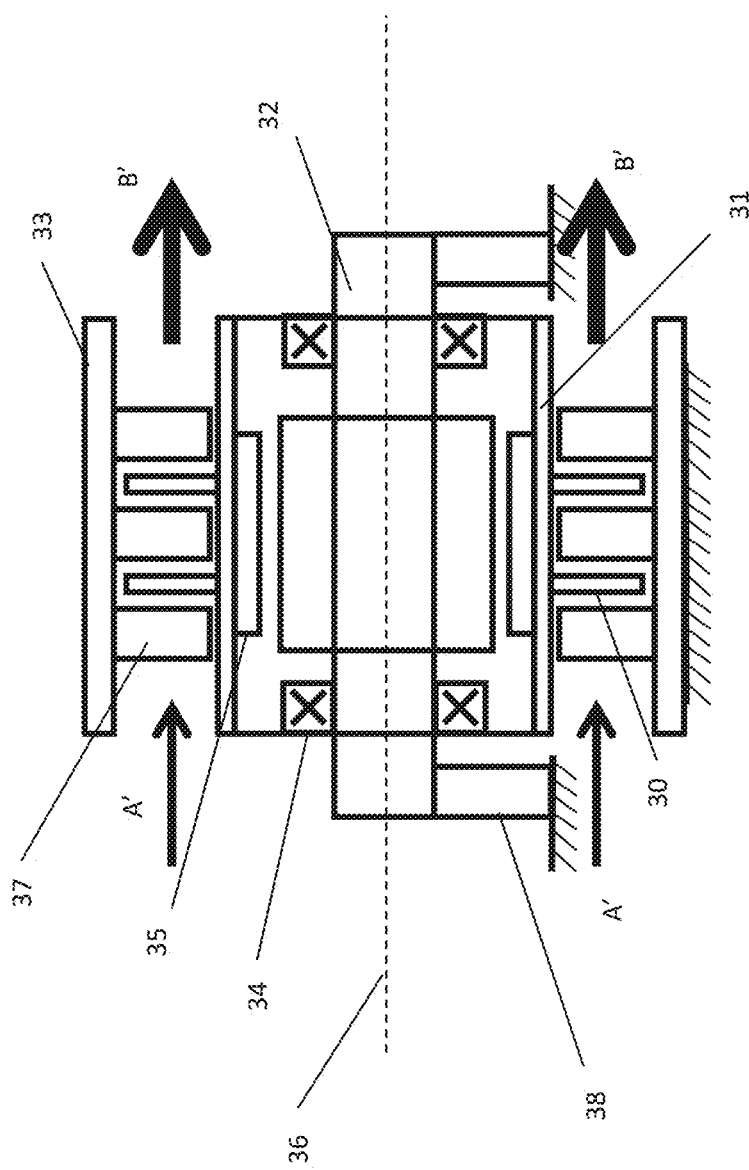
FIG. 3 is a sectional side view of a turbine generator as claimed herein.

FIGS. 2 and 3 show schematic sectional side views of embodiments of the turbine generators according to the present disclosure. Whilst FIGS. 2 and 3 are generally more applicable for use in conjunction with steam turbines, the arrangement may equally be applied to a gas turbine engine. In these figures, the single rotor turbine-generator (SRTG) mounts the rotating elements of both the prime mover and the generator to a single rotating part. The static element of either the prime mover or the generator will be the core section of the machine, thus inverting the traditional machine layout.

FIG. 2 shows an example arrangement of a SRTG. The electrical generator rotor is of a drum design being hollow and having a wall thickness that is small in relation to its diameter. The rotor has an inner and an outer surface onto which rotating elements of a steam turbine and the generator are mounted. The steam turbine element, which is mounted inside the drum, generates a torque by expanding steam through a number of stages comprising static and rotating aerofoils as in a traditional design. The torque leads to rotation of the drum about a central axis. The generator element of the rotor has permanent magnets, which are mounted to the drum surrounding the central axis. This when rotated within an armature generates electrical power.

Regarding FIG. 2, a rotor hub 21 is shown that is rotatable about a central axis 26. Rotor blades 20 extend radially inwards from the rotor hub 21. A stator hub 23 is positioned along the rotational axis 26 radially inside the rotor hub 21 and has vanes 27 extending radially outwardly from it. These vanes are configured in the classical stator vane configuration. The stator hub 23 is supported by mounts 28. The rotor hub 21 is supported on bearings 24. The rotor hub 21 has a permanent magnet(s) 25 on its radially outer surface. A generator stator 22 circumferentially surrounds the rotor hub 21. Fluid, such as gas, liquid, or vapour, or combinations comprising one or more of the same, enters the rotor chamber as shown by arrow A and exits the flow path as shown by arrow B. In this the steam is supplied to the turbine via a valve, or valves, which regulate its flow. For higher power outputs from the turbine generator, the valves will open and allow higher steam flow. The passage of the fluid over the rotor blades causes the hub and its associated permanent magnets to be rotated within the generator stator. The generator can be coupled to any suitable electrical power system or network.

FIG. 3 shows an example arrangement wherein the rotor hub radially surrounds the electrical generator, and the rotor stages extend radially outwardly from the rotor hub. FIG. 3 shows a rotor hub 31 that is rotatable about an axis 36. Rotor blades 30 extend radially outwards from the rotor hub 31. A stator hub 33 is positioned radially outside the rotor hub 31 and has stator vanes stages 37 extending radially outwards. The rotor hub 31 is supported on bearings 34. The rotor hub 31 has permanent magnets 35 on its radially inner surface. A generator stator 32 is arranged radially inside the rotor hub 31. The generator stator 32 is supported on mounts 38. Fluid, such as gas, liquid, or vapour, or combinations comprising one or more of the same enters a flow path between the rotor and stator hubs as shown by arrows A' and exits the rotor as shown by arrows B'. The fluid flow through this passage results in a rotation of the rotor hub through interaction between the fluid and the turbine blades mounted to the rotor hubs.

As in conventional generators, the movement of a permanent magnet with respect to a generator stator causes the generator to generate electrical power. The movement of these is driven by the flow of fluid through the passageway over the turbine blades of the SRTG. The components shown extend around the circumference of the rotational axis 26,36. Steam can be fed into these generators from a boiler using any suitable pipe arrangement, and any suitable boiler arrangement. Steam can then be collected at the exit B and fed into a condenser before being fed back into the boiler.

The permanent magnet 25,35 may be a single ring or a plurality of separate permanent magnets distributed, for example evenly distributed, around the circumference of the rotor section 21,31. The permanent magnets 25,35 may be fastened or mechanically coupled to the rotor hub 21,31. The permanent magnets 25,35 are axially aligned with the generator stator 22,32. The permanent magnets 25,35 have an axial length that corresponds with the generator stator 22,32, for example suitable for generating efficient electrical power.

Figure 4:
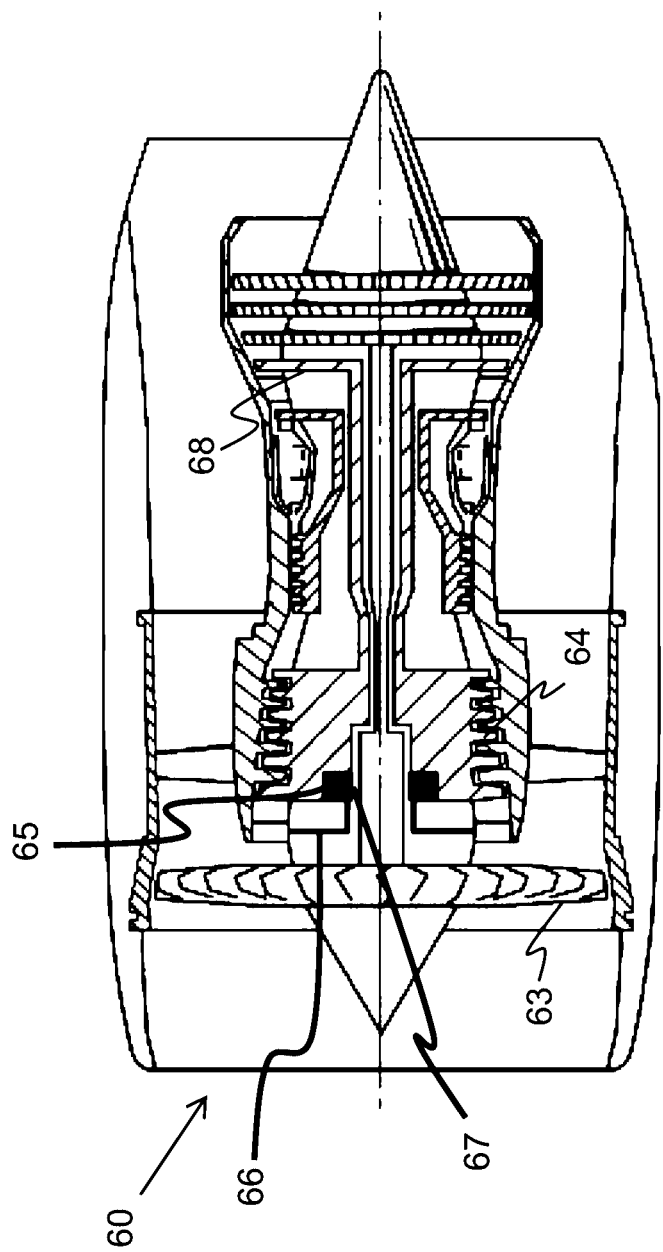
FIG. 4 is a sectional side view of a gas turbine engine comprising a turbine generator as claimed herein.

FIGS. 2 and 3 show three stator stages of stator blades 27,37. FIGS. 2 and 3 show two rotor stages of rotor blades 20,30. The rotor stages and stator stages are interspersed. In other examples there may be a greater or less number of rotor or stator stages. In other examples the rotor hub 21,31 may have a different shape, for example conical, frustoconical, curved or made of a plurality of curves. The extremal shape of the rotor hub can be optimised to the requirements of the prime mover. For example, as the working fluid expands along the rotor a larger passage area will be required; thus, leading to a conical shape. The internal shape of the rotor hub can be a plain cylinder. Alternatively, it can be profiled to aid the flow of cooling air over the generator FIG. 4 shows a sectional side view of a gas turbine 60, comprising a turbine generator according to the present disclosure. The compressor 64 has a plurality of permanent magnets 65 attached to it. A generator stator 67 is arranged radially inside the permanent magnets 65 to form a generator. The permanent magnets 65 and generator stator 67 are axially aligned. The generator stator 67 is supported by a mount 66 to a static part of the gas turbine engine 60. The gas turbine 60 also has a fan 63 and turbine section 68. The turbine section 68 drives the compressor 64 in a conventional manner. In this example of an aviation gas turbine engine the gas turbine would provide motive thrust for the aircraft plus, by virtue of the integrated generator, will provide electrical power output. This may be used to power aircraft electrical systems or may be used within a hybrid propulsion architecture where emery is stored in a battery and used to power motor driven propulsion engines. Alternative gas turbine applications could be pure power generation and could be used in place of conventional gas turbine driven generators.

As the compressor rotor 44 rotates about the rotational axis 41 during operation, the permanent magnets 45 move with respect to the generator stator 47 thereby forming a generator and generating electrical power. The electrical power may be used for auxiliary systems of the gas turbine 40. In alternative arrangements the permanent magnets 45 and generator stator 47 may be arranged on a different rotating component of the gas turbine engine, for example a turbine section, and/or may be on the radially outer part of the rotating part. In other embodiments the permanent magnets 45 and generator stator 47 may be larger or smaller depending on the power requirements. In other embodiments there may be no fan, for example when the gas turbine is for ground based power generation.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What we claim is:

1. A turbine generator comprising:
   a turbine rotor comprising a rotor hub and a blade stage, the blade stage comprising a circumferential array of rotor blades in driving engagement with the rotor hub;
   a turbine stator comprising a stator hub and a vane stage, the vane stage comprising a circumferential array of vanes;
   the turbine rotor and the turbine stator being concentrically arranged about a common axis to define an annular flow path, the vane stage and the blade stage being axially spaced along the common axis, and having one or more magnets arranged on the turbine rotor; and
   a generator stator concentrically aligned with the turbine rotor, the turbine stator, and the one or more magnets whereby, when the turbine rotor is driven to rotate about the common axis, the one or more magnets on the turbine rotor rotate relative to the generator stator in order to generate electric power, wherein
   each of the rotor blades has a free end and an end attached to the rotor hub, and
   each of the one or more magnets is attached to the rotor hub adjacent to where a respective one of the ends is attached to the rotor hub.

2. The turbine generator as claimed in claim 1, wherein the generator stator is arranged along the common axis with the turbine stator radially outermost.

3. The turbine generator as claimed in claim 1, wherein the turbine stator is arranged along the common axis with the generator stator radially outermost.

4. The turbine generator as claimed in claim 1, wherein each of the one or more magnets are axially aligned with a rotor stage.

5. The turbine generator as claimed in claim 1, wherein each of the one or more magnets do not extend axially beyond the rotor hub.

6. The turbine generator as claimed in claim 1, wherein each of the one or more magnets abut the rotor hub.

7. The turbine generator as claimed in claim 1, wherein the rotor hub is cylindrical.

8. The turbine generator according to claim 1, wherein the turbine generator is a compressor of a gas turbine engine.

9. A gas turbine engine comprising the turbine generator according to claim 8.

10. The turbine generator according to claim 1, wherein the turbine generator is a steam turbine.

11. The turbine generator according to claim 1, wherein the turbine generator is a turbine of a gas turbine engine.

12. The turbine generator according to claim 1, wherein the turbine generator is a steam turbine for a Rankine cycle.

13. A turbine generator as claimed in claim 1, wherein each of the one or more magnets is fastened to a surface of the rotor hub.

\* \* \* \* \*